(12) United States Patent
Zhao et al.

(10) Patent No.: US 12,490,165 B2
(45) Date of Patent: Dec. 2, 2025

(54) METHOD AND DEVICE FOR REDIRECTION FROM LTE TO NR AFTER EPS FALLBACK

(71) Applicant: CHINA TELECOM CORPORATION LIMITED, Beijing (CN)

(72) Inventors: Xiaoyin Zhao, Beijing (CN); Zhijun Li, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 522 days.

(21) Appl. No.: 17/919,775

(22) PCT Filed: Apr. 30, 2021

(86) PCT No.: PCT/CN2021/091355
§ 371 (c)(1),
(2) Date: Oct. 19, 2022

(87) PCT Pub. No.: WO2021/238582
PCT Pub. Date: Dec. 2, 2021

(65) Prior Publication Data
US 2023/0164642 A1 May 25, 2023

(30) Foreign Application Priority Data
May 28, 2020 (CN) .......................... 202010465897.0

(51) Int. Cl.
*H04W 36/30* (2009.01)
*H04W 36/00* (2009.01)
(Continued)

(52) U.S. Cl.
CPC .... *H04W 36/302* (2023.05); *H04W 36/00224* (2023.05); *H04W 36/1443* (2023.05); *H04W 76/30* (2018.02)

(58) Field of Classification Search
CPC ....... H04W 36/0022; H04W 36/00222; H04W 36/144; H04W 36/1443; H04W 36/18;
(Continued)

(56) References Cited

U.S. PATENT DOCUMENTS

2013/0295928 A1  11/2013  Suzuki
2015/0296420 A1  10/2015  Drevon et al.
(Continued)

FOREIGN PATENT DOCUMENTS

CN  101686487 A  3/2010
CN  101742598 A  6/2010
(Continued)

OTHER PUBLICATIONS

Decision to Grant a Patent issued Apr. 18, 2024 in CN Application No. 2022-572725, 6 pages.
(Continued)

*Primary Examiner* — Pao Sinkantarakorn
(74) *Attorney, Agent, or Firm* — Andrew M. Calderon; Calderon Safran & Wright P.C.

(57) ABSTRACT

The present disclosure relates to a method and device for redirection from LTE to NR after EPS Fallback. Disclosed is a method executed by user equipment for redirection from an LTE cell to an NR cell after EPS Fallback, including: after a VoLTE voice bearer is released, a user equipment maintains a RRC connection with an LTE cell, and measures the quality of service of a cell adjacent to the user equipment according to a cell connected mode frequency priority, wherein the priority of the NR cell is set to be higher than that of the LTE cell, so that the quality of service of the NR cell adjacent to the user equipment is measured first; and when the quality of service measurement result for the adjacent NR cell reaches a preset threshold, the user equipment redirects to the adjacent NR cell.

12 Claims, 5 Drawing Sheets

(51) Int. Cl.
*H04W 36/14* (2009.01)
*H04W 76/30* (2018.01)

(58) Field of Classification Search
CPC .. H04W 36/302; H04W 36/304; H04W 76/30
See application file for complete search history.

(56) References Cited

U.S. PATENT DOCUMENTS

| | | | |
|---|---|---|---|
| 2015/0312809 A1 | 10/2015 | Shu et al. | |
| 2019/0090165 A1 | 3/2019 | Huang-Fu et al. | |
| 2020/0275332 A1* | 8/2020 | Chong | H04W 28/0865 |
| 2020/0383010 A1* | 12/2020 | Zhu | H04W 36/00226 |
| 2021/0076264 A1* | 3/2021 | Zhang | H04W 36/0085 |
| 2021/0195470 A1* | 6/2021 | Lei | H04W 76/10 |
| 2021/0345185 A1* | 11/2021 | Kodali | H04W 36/0085 |

FOREIGN PATENT DOCUMENTS

| | | |
|---|---|---|
| CN | 103517363 A | 1/2014 |
| CN | 103731895 A | 4/2014 |
| CN | 103906090 A | 7/2014 |
| CN | 103906158 A | 7/2014 |
| CN | 103906183 A | 7/2014 |
| CN | 104284380 A | 1/2015 |
| CN | 105025542 A | 11/2015 |
| CN | 105338578 A | 2/2016 |
| CN | 108282810 A | 7/2018 |
| CN | 108377521 A | 8/2018 |
| CN | 110637477 A | 12/2019 |
| CN | 110710247 A | 1/2020 |
| CN | 110881193 A | 3/2020 |
| CN | 110933704 A | 3/2020 |
| CN | 111182593 A | 5/2020 |
| JP | 2013-66040 | 4/2013 |
| JP | 2017-108463 X | 6/2017 |
| WO | 2019/096077 A1 | 5/2019 |
| WO | 2019/097498 A1 | 5/2019 |

OTHER PUBLICATIONS

Unknown, "Impacts of SRVCC", 3GPP TSG-RAN WG2 #105, Shenzhen, P.R. China Mar. 18-21, 2019, 2 pages.
Unknown, "Discussion for returning back to NR in case of handover for voice", SA WG2 Meeting 122bis, Ljubljana, Slovenia, Oct. 23-27, 2017, 3 pages.
Unknown, "Return to NR from EPS/RAT fallback", 3GPP TSG-SA WG2 Meeting #133, Reno, Nevada, May 13-17, 2019, 3 pages.
International Search Report issued on Jul. 20, 2021 in corresponding Application No. PCT/CN2021/091355; 5 pages.
Ericsson et al. "Return to NG-RAN after EPS/RAT Fallback"; SA WG2 Meeting #S2-131, S2-1901483, Feb. 19, 2019 (Feb. 19, 2019), sections 2 and 3; 4 pages.
Ericsson et al. "Return to NG-RAN after EPS Fallback or RAT Fallback in 5GS"; 3GPP TSG-SA WG2 Meeting #131; S2-1901484, Feb. 25-Mar. 1, 2019, 3 pages.
Lin et al. "Research on the Key Technologies of CSFB Voice Solution"; China Unicom Network Technology Research Institute, Beijing 100048, China; Monthly Focus Nov. 27, 2013; 5 pages (English Abstract).
"Consideration on Enhanced Redirection from UMTS to LTE in Cell_FACH"; ZTE China Unicom; R2-121111; 3GPP TSG-RAN WG2 meeting #77bis; Mar. 26 to 30, 2012, Jeju, Korea; 4 pages.
Extended European Search Report issued on Jul. 7, 2023 in corresponding EP Application No. 21814010.1; 13 pages.
Ericsson et al: "Return to NR from EPS/RAT fallback", 3GPP Draft; S2-1905013Return From EPS Fallback_CL, 3rd Generation Partnership Project (3GPP), Mobile Competence Centre; 650, Route Des Lucioles; F-06921 Sophia-Antipolis Cedex; France vol. SA WG2, No. Reno, Nevada; May 13, 2019-May 17, 2019 May 7, 2019 (May 7, 2019); 3 pages.
3rd Generation Partnership Project; Technical Specification Group Radio Access Network; Evolved Universal Terrestrial Radio Access (E-UTRA); Radio Resource Control (RRC); Protocol specification (Release 13) -3GPP TS 36.331 V13.13.0 (Mar. 2019); 649 pages.
Vivo: "How to return to 5G", 3GPP Draft; S2-183508, 3rd Generation Partnership Project (3GPP), Mobile Competence Centre; 650, Route Des Lucioles; F-06921 Sophia-Antipolis Cedex ; France vol. SA WG2, No. Sanya, China; Apr. 16, 2018-Apr. 20, 2018 Apr. 10, 2018 (Apr. 10, 2018); 4 pages.
CMCC et al: "38.331 CR to introduce alternative cell reselection priority for SA", 3GPP Draft; R2-2003494, 3rd Generation Partnership Project (3GPP), Mobile Competence Centre; 650, Route Des Lucioles; F-06921 Sophia-Antipolis Cedex ; France vol. RAN WG2, No. Online Meeting; Apr. 20, 2020-Apr. 30, 2020 Apr. 10, 2020 (Apr. 10, 2020); 19 pages.

* cited by examiner

METHOD AND DEVICE FOR REDIRECTION FROM LTE TO NR AFTER EPS FALLBACK

The present application is a U.S. National Stage Application under 35 U.S.C. § 371 of International Patent Application No. PCT/CN2021/091355, filed on Apr. 30, 2021, which claims priority to China Patent Application No. 202010465897.0 filed on May 28, 2020, the disclosures of both of which are incorporated by reference herein in their entirety.

TECHNICAL FIELD

The present disclosure relates to a method and device for redirection from LTE (Long Term Evolution) to NR (New Radio) after EPS Fallback.

BACKGROUND

The 3GPP standard defines two types of networking, comprising Standalone (SA) networking in which LTE and 5G NR are deployed independently and Non-standalone (NSA) networking in which LTE and 5G NR are deployed with dual connectivity. Among them, the voice solution under SA initially uses the solution of fallback from 5G NR to 4G LTE (Evolved Packet System (EPS) Fallback). That is, as shown in FIG. 1, when a user equipment (UE) working on a 5G network initiates a voice call or has an incoming voice call, a voice service is performed by Voice over Long-Term Evolution (VoLTE) technology of 4G network after a handover flow from Next Generation Core (NGC) network of 5G to Evolved Packet Core (EPC) network of 4G.

Normally, after a voice service ends, UE first enters the idle mode and radio resource control (RRC) connection between UE and the LTE cell is released, and then UE is connected to the NR cell through a reselection function.

SUMMARY

According to one aspect of the embodiments of the present disclosure, a method, performed by a user equipment, for redirection from an LTE cell to an NR cell after EPS Fallback is provided. The method comprises: maintaining, by the user equipment, a radio resource control (RRC) connection with the LTE cell after a voice bearer of VoLTE is released, and measuring, according to a cell connected mode frequency priority, a service quality of an adjacent cell of the user equipment, wherein the cell connected mode frequency priority is set with a priority of an adjacent NR cell higher than a priority of an adjacent LTE cell, such that priority is given to measuring the service quality of the adjacent NR cell of the user equipment; and redirecting, by the user equipment, to the NR cell which is an adjacent NR cell in a case where a service quality measurement result of the NR cell reaches a predetermined threshold.

According to another aspect of the embodiments of the present disclosure, a user equipment for a user side of a wireless communication system is provided. The user equipment comprises a processing circuit configured to maintain a radio resource control (RRC) connection with a LTE cell after a voice bearer of VoLTE is released, and measure, according to a cell connected mode frequency priority, a service quality of an adjacent cell of the user equipment, wherein the cell connected mode frequency priority is set with a priority of an adjacent NR cell higher than a priority of an adjacent LTE cell, such that priority is given to measuring the service quality of the adjacent NR cell of the user equipment; and redirect to an NR cell which is an adjacent NR cell in a case where a service quality measurement result of the NR cell reaches a predetermined threshold.

According to another aspect of the embodiments of the present disclosure, an electronic device on a control side of a wireless communication system is provided. The electronic device comprises: a processing circuit configured to maintain a RRC connection with a user equipment after a voice bearer of VoLTE is released; send an information about a cell connected mode frequency priority to the user equipment, wherein the cell connected mode frequency priority is set with a priority of an adjacent NR cell higher than a priority or an adjacent LTE cell, such that priority is given to measuring the service quality of the adjacent NR cell of the user equipment; and send a redirection instruction to the user equipment in a case where a service quality measurement result of an NR cell which is an adjacent NR cell reaches a predetermined threshold, such that the user equipment is redirected to the NR cell.

According to another aspect of the embodiments of the present disclosure, a computer-readable storage medium having stored thereon instructions is provided. The instructions, when executed by a processor of a user equipment, cause the processor to implement the method for redirection from an LTE cell to an NR cell after EPS Fallback described above.

Other features and advantages of the present disclosure will become apparent from the following detailed description of exemplary embodiments of the present disclosure with reference to the accompanying drawings.

BRIEF DESCRIPTION OF THE ACCOMPANYING DRAWINGS

In order to more explicitly explain the embodiments of the present disclosure or the technical solutions in the relevant art, the accompanying drawings required to be used in the description of the embodiments or the relevant art will be briefly introduced below. It is apparent that, the accompanying drawings described below are merely some of the embodiments of the present disclosure. For those skilled in the art, other accompanying drawings may also be obtained according to these accompanying drawings on the premise that no inventive effort is involved.

DETAILED DESCRIPTION

Figure 1:
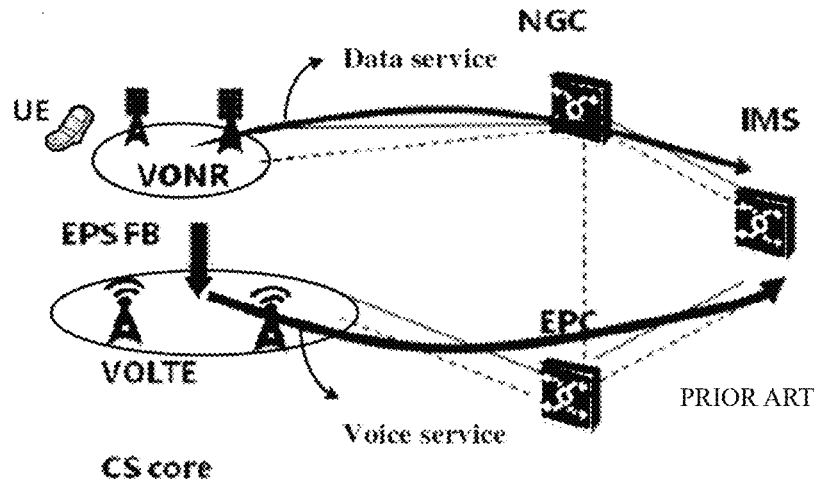
FIG. 1 is a schematic view showing EPS Fallback in a traditional voice service.

Various exemplary embodiments of the present disclosure will now be described in detail with reference to the accompanying drawings. It should be noted that: unless additionally specified, the relative arrangements of the components and steps, numerical expressions and numerical values expounded in these examples do not limit the scope of the present disclosure. At the same time, it should be understood that, for ease of description, the dimensions of various parts shown in the accompanying drawings are not drawn according to actual proportional relations.

The following descriptions of at least one exemplary embodiment which are in fact merely illustrative, shall by no means serve as any delimitation on the present disclosure as well as its application or use.

The techniques, methods, and devices known to those of ordinary skill in the relevant art might not be discussed in detail. However, the techniques, methods, and devices shall be considered as a part of the description where appropriate. Among all the examples shown and discussed here, any specific value shall be construed as being merely exemplary rather than as being restrictive. Thus, other examples in the exemplary embodiments may have different values. It is to be noted that: similar reference signs and letters present similar items in the following accompanying drawings, and therefore, once an item is defined in one accompanying drawing, it is unnecessary to make further discussion on the same in the subsequent accompanying drawings.

Typically, a wireless communication system comprises at least a control side and a terminal side, and a device of the control side can provide communication service for one or more devices of the terminal side.

In the present disclosure, the "control side" of the wireless communication system has a full span in its normal meaning, and generally refers to a side of the communication system where a signal flow is transmitted to perform control, for example, a side of the communication system where redirection is triggered. Similarly, the term "terminal/user side" has a full span in its normal meaning, and correspondingly may refer to a side of the communication where a signal flow is received to perform operation in accordance with the control, for example, a side of the communication system where being controlled to perform redirection. As an example, the device of a "control side" may comprise a "base station" in a communication system, and the device of a "terminal side" may correspondingly comprise a "user equipment" in the communication system.

In the present disclosure, the term "base station" has a full span in its normal meaning and comprises at least a wireless communication station as a part of a wireless communication system or a radio system to facilitate communication. As an example, the base station may be, for example, eNB following a 4G communication standard, gNB following a 5G communication standard, a remote radio head, a wireless access point, a drone control tower, or a communication device performing similar functions.

In the present disclosure, the "electronic device of a control side" has full span in its normal meaning, and may comprise, for example, a device as a part of a wireless communication system or a radio system to facilitate controlling redirection. In the present disclosure, the "electronic device of a control side" and the "base station" may be used interchangeably, or the "electronic device of a control side" may be implemented as a part of the "base station".

In the present disclosure, the term "user equipment" or "UE" has a full span in its normal meaning and comprises at least a user equipment as a part of a wireless communication system or a radio system to facilitate communication. As an example, the user equipment may be a user equipment such as a mobile phone, a laptop computer, a tablet computer, or an in-vehicle communication device, or elements thereof.

Entering the 5G era, the requirements for low-delay, high-efficiency and low-cost network transmission are increasingly raised. Like the VoLTE technology of 4G network, the voice service demands of 5G users are required to be considered in the deployment of 5G network. For the voice service of 5G network, a voice solution of Voice over New Radio (VoNR) which is only based on 5G NR may be considered, wherein the data service and the voice service are both carried by 5G network. However, in an initial stage of deploying 5G network, 5G network has a small coverage. If the VoNR solution is used, there will be a low reliability and a poor user experience. Therefore, in a current stage, the solution of fallback from 5G NR to 4G LTE (EPS Fallback) is normally used as a solution for the voice service.

The EPS Fallback technology means that 5G NR does not provide the voice service. When a user equipment working under 5G network initiates a voice call or receives a voice call so that it is necessary to establish a voice bearer on NR, the redirection or handover process of the user equipment is triggered. The user equipment falls back to LTE network and voice service is provided for the user equipment through the VoLTE technology.

Normally, the user equipment of EPS Fallback resides on 5G NR. After registering to 5G network, the user equipment will register to the IP Multimedia Subsystem (IMS) network through 5G network, and IMS signaling will be carried on 5G network. When the user equipment initiates a voice call or receives an incoming voice call request to establish a voice bearer, the user equipment falls back to 4G network and performs voice service through VoLTE. After the voice service ends, the user equipment will first enter an idle mode, and its RRC connection with the LTE cell will be released, and then the user equipment will be connected to the NR cell through a reselection function. Specifically, the main process of reselection is as follows: 1. the user equipment evaluates all Radio Access Technology (RAT) frequencies which are based on priority; 2. the user equipment sequences cells of all relevant frequencies and compare wireless link qualities, according to a general frequency priority of each frequency band carrier transmitted by a system broadcast message; 3. the accessibility of a target cell to be reselected is verified; 4. the target cell is reselected. However, the above reselection process has a long delay, which results in a poor user experience.

In view of the above, the present disclosure provides a technology for a user equipment to redirect from an LTE cell to an NR cell after EPS Fallback. A connected mode frequency priority (the priority of the NR cell is higher than that of the LTE cell) is configured in the LTE system, and a measurement trigger function of redirection to NR is added, so that the user equipment can rapidly return to the NR cell from the LTE cell after EPS Fallback. Specifically, after the voice service of EPS Fallback, when the VoLTE voice hearer is released, the RRC connection between the user equipment and the LTE system is maintained (not entering the idle mode), and the LTE system triggers the user equipment to initiate measurement of the service qualities of adjacent cells. The NR cells are measured first. If the service quality of an NR cell reaches a predetermined threshold, the user equipment is redirected to the NR cell, so that a return delay is reduced, and the user experience is optimized.

The principle and flow of redirecting UE from the LTE cell to the NR cell after the voice service of EPS Fallback according to some embodiments of the present disclosure will be described in detail below with reference to FIGS. 2 and 3.

Figure 2:
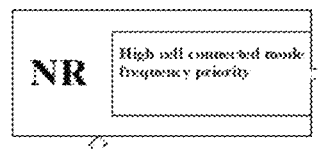
FIG. 2 is an exemplary schematic view showing a voice service of EPS Fallback and redirection for a user equipment from an LTE cell to an NR cell according to some embodiments of the present disclosure.
Figure 2:
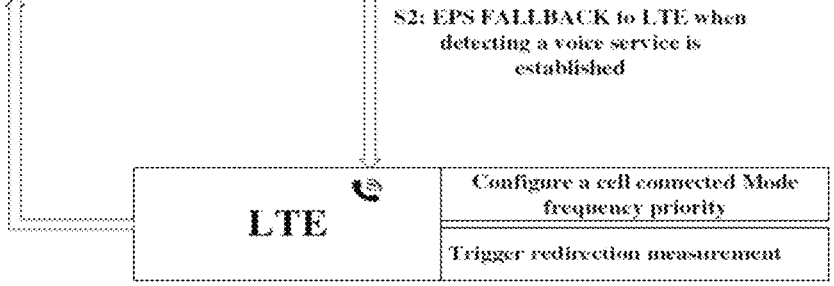

FIG. 2 is an exemplary schematic view showing a voice service of EPS Fallback and redirection for a user equipment from an LTE cell to an NR cell according to some embodiments of the present disclosure.

As shown in FIG. 2, at step S1, UE resides on the NR network. Next, at step S2, when the NR system detects that a voice service is established, EPS Fallback to the LTE system. Next, at step S3, after a voice call ends, the VoLTE voice bearer is released, UE still maintains a RRC connection with the LTE cell, and the redirection measurement trigger function of LTE triggers UE to initiate measuring the service quality of an adjacent cell. At this step, the LTE may further configure and send a cell connected mode frequency priority to UE, wherein the priority of the NR cell is configured to be higher than that of the LTE cell. Then, at step S4, since the NR cell has a higher priority, the adjacent NR cell is measured first when UE is in a connected mode. If the service quality of an adjacent NR cell reaches a predetermined threshold, UE is redirected to this adjacent NR cell, thereby continuing to carry out a data service under the NR network.

Figure 3:
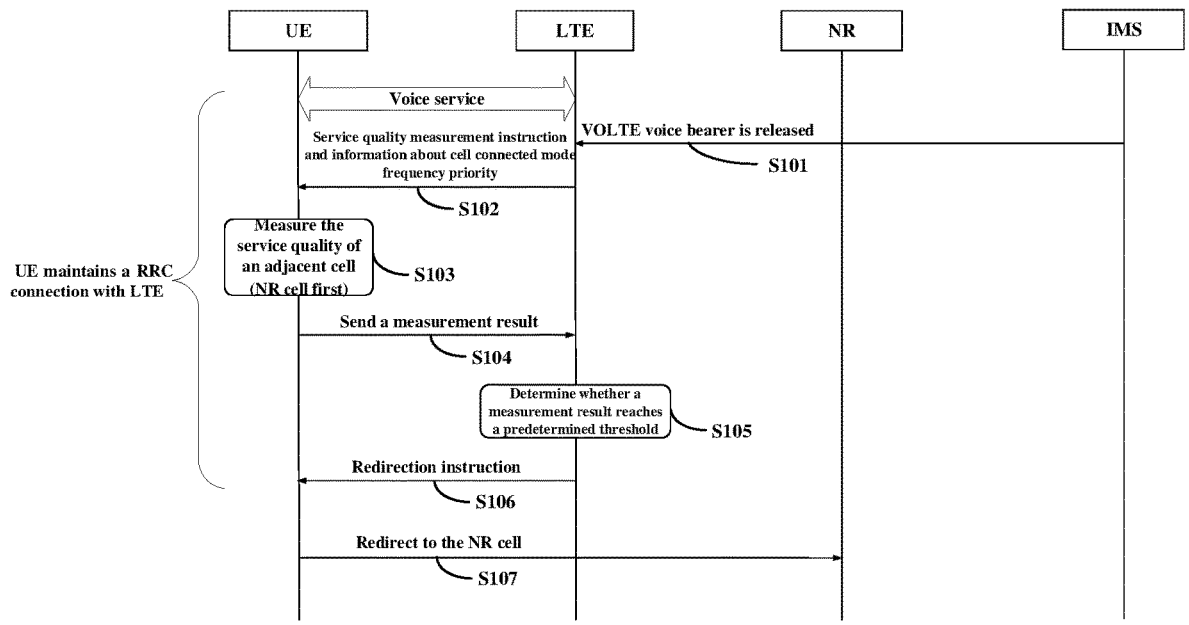
FIG. 3 is an exemplary signaling flow chart showing redirection from an LTE cell to an NR cell of a user equipment after a voice service of EPS Fallback according to some embodiments of the present disclosure.

FIG. 3 is an exemplary signaling flow chart showing redirection from an LTE cell to an NR cell of a user equipment after a voice service of EPS Fallback according to some embodiments of the present disclosure. It is to be noted that, the main steps of redirection will be described below. It should be appreciated that, the redirection method according to these embodiments naturally comprises other necessary step(s).

As shown in FIG. 3, under the EPS Fallback technology of SA, the LTE system provides voice service for UE through VoLTE. At step S101, the voice bearer of VoLTE is released, but UE still maintains a RRC connection with the LTE cell. Next, at step S102, UE receives a service quality measurement instruction and an information about a cell connected mode frequency priority from the LTE system. According to these embodiments, the cell connected mode frequency priority is set by the LTE system, and the priority of the NR cell is set to be higher than that of the LTE cell, so that priority is given to measuring the service quality of the adjacent NR cell of UE. Next, at step S103, in response to a service quality measurement instruction from the LTE system, UE measures the service quality of the adjacent NR cell of UE according to the cell connected mode frequency priority. As described above, here, since the priority of the NR cell is higher than that of the LTE cell, UE gives priority to measuring the service quality of the adjacent NR cell. Next, at step S104, UE sends a service quality measurement result to the LTE system. Then, at step S105, the LTE system determines whether the service quality measurement result of an adjacent NR cell reaches a predetermined threshold, and the LTE system sends a redirection instruction to UE in a case where the predetermined threshold is reached. Next, at step S106, UE receives the redirection instruction from the LTE system. Next, at step S107, UE redirects to the adjacent NR cell in response to the redirection instruction.

It is to be noted that, before step S107, UE always maintains the RRC connection with the LTE system. According to these embodiments, at step S107, UE completes a process of redirection to the adjacent NR cell by disconnecting the RRC connection with the LTE cell and establishing a RRC connection with the adjacent NR cell.

In some embodiments, in a case where there is a plurality of adjacent NR cells in the vicinity of UE, UE may be redirected to the NR cell once an NR cell with the service quality measurement result reaching the predetermined threshold is detected. Otherwise, detection is continued. Such a method will be mainly introduced below.

Alternatively, in other embodiments, UE may also be redirected to a NR cell with the best service quality measurement result among NR cells each with the service quality measurement result reaching the predetermined threshold. In this case, UE measures the service qualities of a plurality of adjacent NR cells and sends the service quality measurement results of the plurality adjacent NR cells to the LTE system. The LTE system determines whether the service quality measurement results each reach the predetermined threshold and determines a NR cell with the best service quality measurement result among NR cells each with the service quality measurement result reaching the predetermined threshold, and then UE is redirected to this NR cell.

The methods for a user equipment to redirect from an LTE cell to an NR cell after EPS Fallback according to some embodiments of the present disclosure have been described above. The user equipment for a user side of a wireless communication system according to embodiments will be introduced below.

Figure 4:
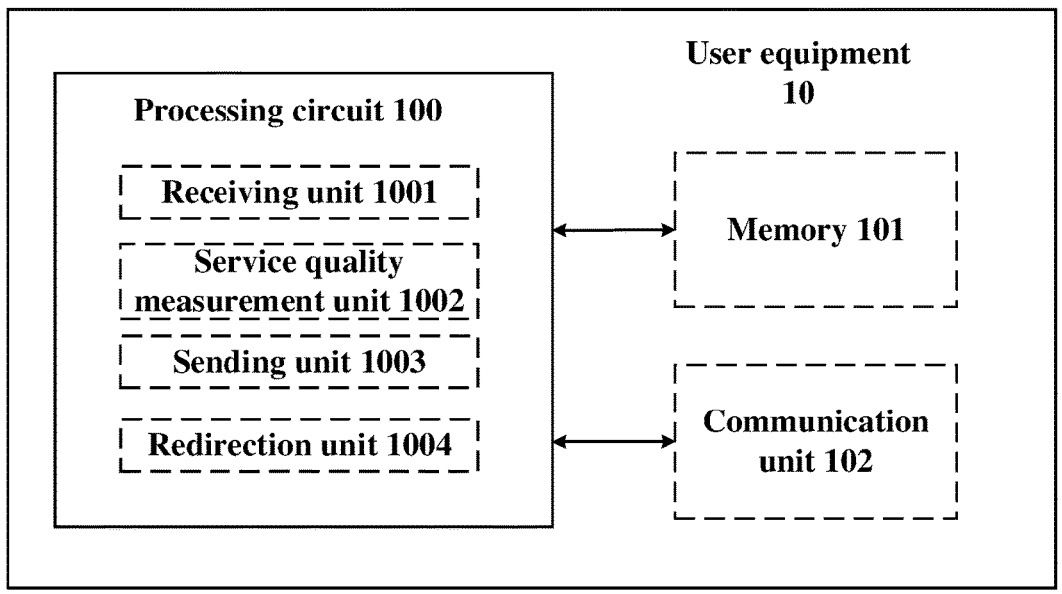
FIG. 4 is a block view showing an exemplary structure of a user equipment for a user side of a wireless communication system according to some embodiments of the present disclosure.

FIG. 4 is a block view showing an exemplary structure of a user equipment 10 for a user side of a wireless communication system according to some embodiments of the present disclosure.

As shown in FIG. 4, the user equipment 10 according to embodiments of the present disclosure comprises a processing circuit 100, a memory 101 and a communication unit 102.

According to these embodiments, the processing circuit 100 may be configured to maintain a RRC connection with the LTE cell after the voice bearer of VoLTE is released, and measure the service quality of an adjacent cell of a user equipment according to a cell connected mode frequency priority, wherein the cell connected mode frequency priority is set with the priority of the NR cell higher than that of the LTE cell, such that the service quality of an adjacent NR cell of the user equipment is measured first; and redirect to the adjacent NR cell in a case where the service quality measurement result of the adjacent NR cell reaches a predetermined threshold.

In the structural example of the user equipment 10, the processing circuit 100 may be in the form of a general processor, or a dedicated processing circuit, for example, ASIC. For example, the processing circuit 100 can be constructed by a circuit (hardware) or a central processing device (for example, a central processing unit (CPU)). In addition, the processing circuit 100 may carry a program (software) for operating a circuit (hardware) or a central processing device. This program can be stored in the memory 101 (for example, arranged in the memory 101) or in an external storage medium connected from the outside, and downloaded via a network (for example, Internet).

According to some embodiments, the processing circuit 100 may comprise a receiving unit 1001. The receiving unit 1001 may be configured to receive a service quality measurement instruction and an information about the cell connected mode frequency priority from the LTE system. In these embodiments, the cell connected mode frequency priority is set by the LTE system.

According to some embodiments, the processing circuit 100 may further comprise a service quality measurement unit 1002. The service quality measurement unit 1002 may be configured to measure the service quality of an adjacent cell of the user equipment 10 according to the cell connected mode frequency priority, in response to the service quality measurement instruction from the LTE system. The service quality of an adjacent NR cell of the user equipment 10 is measured first.

According to some embodiments, the process in circuit 100 may further comprise a sending unit 1003. The sending unit 1003 may be configured to send a service quality measurement result to the LTE system for subsequent determination by the LTE system.

According to some embodiments, the receiving unit 1001 may be further configured to receive a redirection instruction from the LTE system. The redirection instruction is sent by the LTE system in response to the service quality measurement result of an adjacent NR cell reaching a predetermined threshold.

The processing circuit 100 may also comprise a redirection unit 1004. The redirection unit 1004 may be configured to redirect the user equipment 10 to an adjacent NR cell in response to the redirection instruction. Specifically, in some embodiments, the step of redirecting to the adjacent NR cell comprises disconnecting the RRC connection with the LTE cell and establishing a RRC connection with the adjacent NR cell. In some embodiments, in a case where there is a plurality of adjacent NR cells in the vicinity of the user equipment 10, the redirecting unit 1004 may redirect the user equipment 10 to the NR cell once the NR cell is detected to be with the service quality measurement result reaching the predetermined threshold. Alternative in other embodiments, the redirecting unit 1004 may redirect the user equipment 10 to the NR cell with the best service quality measurement result among the NR cells each with the service quality measurement result reaching the predetermined threshold.

In addition, in some embodiments, the user equipment 10 may further comprise the memory 101 and the communication unit 102 shown in dashed lines in FIG. 4. Furthermore, the user equipment 10 may also comprise other members not shown, for example a radio frequency link, a baseband processing unit, a network interface, a processor, a controller, or the like. The processing circuit 100 may be associated with the memory 101 and/or the communication unit 102. For example, the processing circuit 100 may be directly or indirectly connected (for example, possibly connected with other member(s) therebetween) to the memory 101 for data access. As another example, the processing circuit 100 may be directly or indirectly connected to the communication unit 102 to transmit a radio signal via the communication unit 102 and to receive a radio signal via the communication unit 102.

The memory 101 may store various information generated by the processing circuit 100, various information to be utilized by the processing circuit 100 (for example, the service quality measurement result or the like), programs and data for operation of the user equipment 10, and data to be sent by the communication unit 102. The memory 101 is delineated with dashed lines, as it may also be located within the user equipment 10 or outside the user equipment 10. The memory 101 may be a volatile memory and/or a non-volatile memory. For example, the memory 101 may comprise, but is not limited to, random access memory (RAM), dynamic random access memory (DRAM), static random access memory (SRAM), read only memory (ROM), or flash memory.

The communication unit 102 may be configured to communicate with an electronic device under the control of the processing circuit 100. In an example, the communication unit 102 may be implemented as a transmitter or transceiver and comprise communication members such as an antenna array and/or a radio frequency link. In some embodiments, the communication unit 102 may send the service quality measurement result(s) determined in the processing circuit 100 to the electronic device. In some embodiments, the communication unit 102 may also send and receive signaling required for the process described in the embodiments according to the present disclosure.

Although FIG. 4 shows that the processing circuit 100 is separated from the communication unit 102, the processing circuit 100 may also be implemented to comprise the communication unit 102. Furthermore, the processing circuit 100 may also be implemented to comprise one or more other members in the user equipment 10, or the processing circuit 100 may be implemented as the user equipment 10 itself. In actual implementations, the processing circuit 100 may be implemented as a chip (for example, an integrated circuit module comprising a single wafer), a hardware component, or a complete product.

It should be noted that, the above various units are only logical modules divided according to the specific functions realized by the same, but not intended to limit specific implementations. For example, each unit may be implemented in the form of software, hardware, or a combination of software and hardware. In actual implementations, the above various units may be each implemented as an independent physical entity or may also be implemented by a single entity (for example, a processor (CPU or DSP, etc.), an integrated circuit, or the like). In addition, the above various units are shown with dotted lines in the accompanying drawings to indicate that these units may not actually exist, and the operations/functions realized by these units may be implemented by the processing circuit itself.

Figure 5:
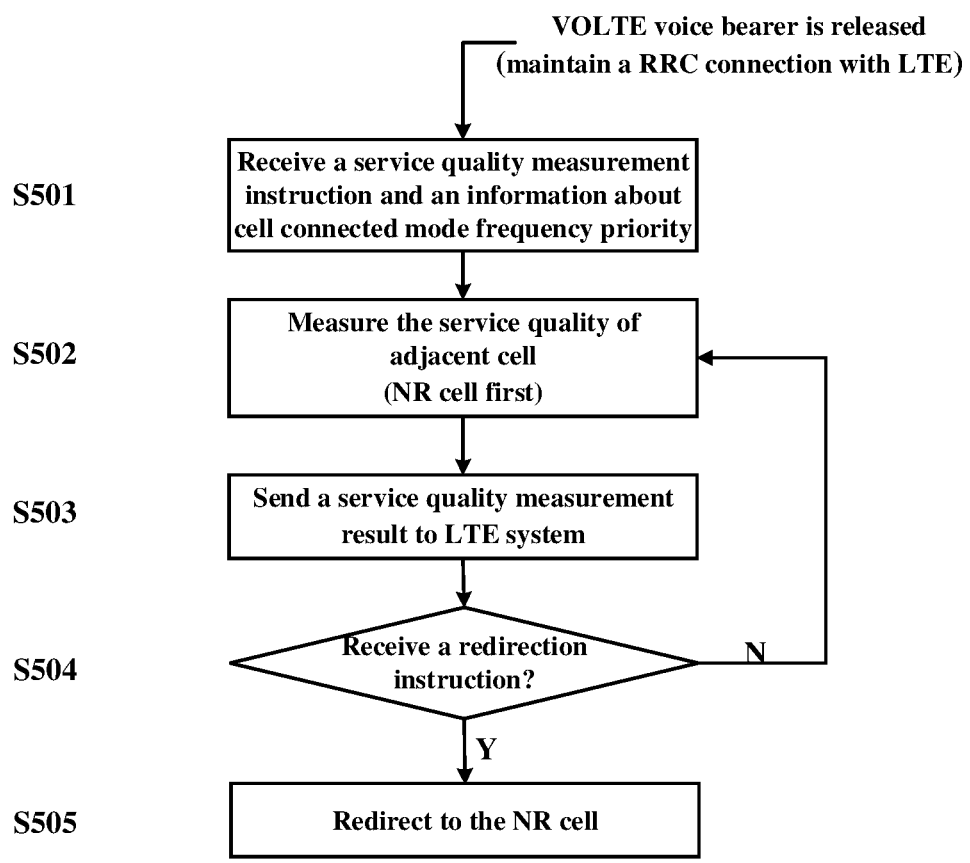
FIG. 5 is a flowchart showing operation of a user equipment for a user side of a wireless communication system according to some embodiments of the present disclosure.

FIG. 5 is a flowchart showing operation of a user equipment for a user side of a wireless communication system according to some embodiments of the present disclosure.

As shown in FIG. 5, after the voice bearer of VoLTE is released, the user equipment 10 maintains the RRC connection with the LTE cell. At step S501, the user equipment 10 receives a service quality measurement instruction and an information about a cell connected mode frequency priority from the LTE system. Next, at step S502, in response to the service quality measurement instruction from the LTE system, the user equipment 10 measures the service quality of an adjacent cell of the user equipment 10 according to the cell connected mode frequency priority. The cell connected mode frequency priority is set with the priority of the NR cell higher than that of the LTE cell, such that the service quality of the adjacent NR cell of the user equipment 10 is measured first. Next, at step S503, the user equipment 10 sends a service quality measurement result to the LTE system.

Next, at step S504, the user equipment 10 receives a redirection instruction from the LTE system. The redirection instruction is sent by the LTE system in response to the service quality measurement result of the adjacent NR cell reaching a predetermined threshold. When the user equipment 10 receives the redirection instruction from the LTE system ("Yes" at step S504), at step S505, the user equipment 10 is redirected to the adjacent NR cell in response to the redirection instruction. Specifically, the user equipment 10 first disconnects the RRC connection with the LTE cell, and then establishes a RRC connection with the adjacent NR cell. On the contrary, when the user equipment 10 does not receive the redirection instruction from the LTE system ("No" at step S504), the user equipment 10 continues to measure the service quality of an adjacent cell of the user equipment 10 according to the cell connected mode frequency priority.

The user equipment for a user side of a wireless communication system according to some embodiments of the present disclosure has been described above. The electronic device for a control side of a wireless communication system according to some embodiments of the present disclosure will be introduced below.

Figure 6:
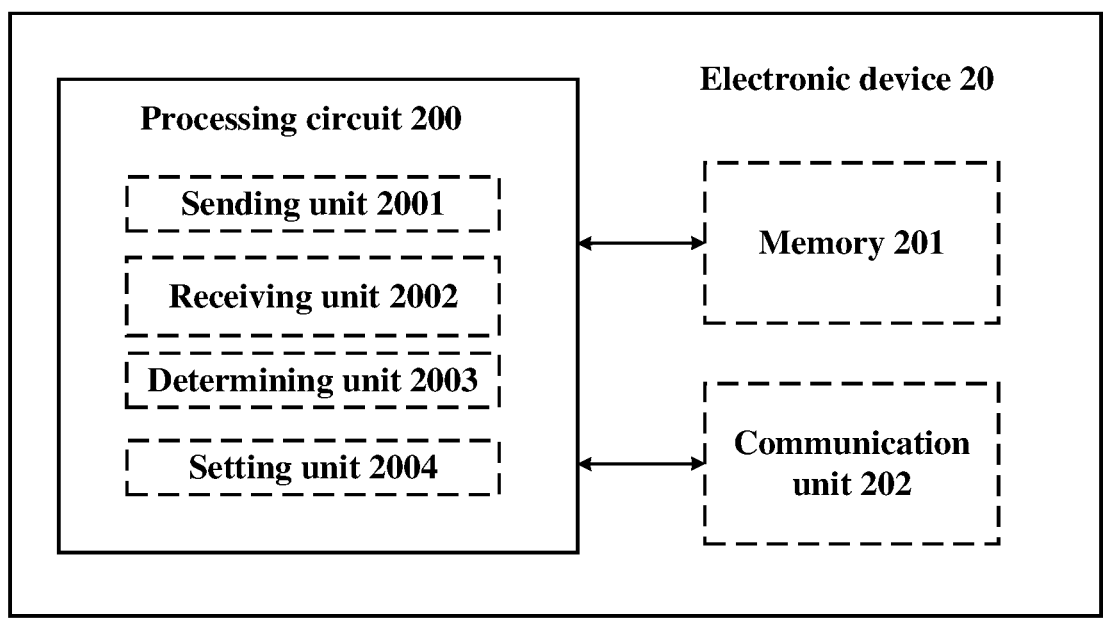
FIG. 6 is a block view showing an exemplary structure of an electronic device for a control side of a wireless communication system according to some embodiments of the present disclosure.

FIG. 6 is a block view showing an exemplary structure of an electronic device 20 for a control side of a wireless communication system according to some embodiments of the present disclosure.

As shown in FIG. 6, the electronic device 20 according to embodiments of the present disclosure comprises a processing circuit 200, a memory 201 and a communication unit 202.

According to these embodiments, the processing circuit 200 may be configured to maintain a RRC connection with a user equipment after the voice bearer of VoLTE is released; send an information about a cell connected mode frequency priority to the user equipment, wherein the cell connected mode frequency priority is set with the priority of the NR cell higher than that of the LTE cell, such that the service quality of an adjacent NR cell of the user equipment can be measured first; and send a redirection instruction to the user equipment such that the user equipment is redirected to an adjacent NR cell in a case where the service quality measurement result of this adjacent NR cell reaches a predetermined threshold.

In the structural example of the electronic device 20, the processing circuit 200 may be in the form of a general processor, or a dedicated processing circuit, for example, ASIC. For example, the processing circuit 100 can be constructed by a circuit (hardware) or a central processing device (for example, a central processing unit (CPU)). In addition, the processing circuit 200 may carry a program (software) for operating a circuit (hardware) or a central processing device. This program can be stored in the memory 201 (for example, arranged in the memory 201) or in an external storage medium connected from the outside, and downloaded via a network (for example, Internet).

According to some embodiments, the processing circuit 200 may comprise a sending unit 2001. The sending unit 2001 may be configured to send the information about the cell connected mode frequency priority to the user equipment. The cell connected mode frequency priority is set with the priority of the NR cell higher than that of the LTE cell, such that the service quality of an adjacent NR cell of the user equipment can be measured first. According to some embodiments, the sending unit 2001 may be further configured to send a service quality measurement instruction to the user equipment, wherein the service quality is measured in response to the service quality measurement instruction.

According to some embodiments, the processing circuit 200 may further comprise a receiving unit 2002. The receiving unit 2002 may be configured to receive the service quality measurement result of an adjacent cell of the user equipment from the user equipment.

According to some embodiments, the processing circuit 200 may further comprise a determining unit 2003. The determining unit 2003 may be configured to determine whether the service quality measurement result of an adjacent NR cell reaches a predetermined threshold. In some embodiments, in a case where there are a plurality of adjacent NR cells in the vicinity of the user equipment and it is desirable that the user equipment is redirected to the NR cell with the best service quality measurement result among NR cells each with the service quality measurement result reaching the predetermined threshold, the determining unit 2003 may also be configured to determine the NR cell with the best service quality measurement result among the NR cells each with the service quality measurement result reaching the predetermined threshold.

According to some embodiments, the sending unit 2001 may be further configured to send a redirection instruction to the user equipment such that the user equipment is redirected to an adjacent NR cell in a case where the service quality measurement result of this adjacent NR cell reaches the predetermined threshold.

In addition, according to some embodiments, the processing circuit 200 may further comprise a setting unit 2004. The setting unit 2004 may be configured to preset the cell connected mode frequency priority in the LTE system before a voice service is performed, such that the cell connected mode frequency priority can be invoked in a redirection process after EPS Fallback according to these embodiments. In some embodiments, the setting unit 2004 may be configured to regularly reset the cell connected mode frequency priority. Alternatively, in other embodiments, the setting unit 2004 may be configured to reset the cell connected mode frequency priority when the LTE network changes.

Furthermore, alternatively, the electronic device 20 may further comprise a memory 201 and a communication unit 202 shown in dashed lines in FIG. 6. In addition, the electronic device 20 may also comprise other components not shown, such as a radio frequency link, a baseband processing unit, a network interface, a processor, a controller, or the like, which will not be described in detail here. The processing circuit 200 may be associated with the memory 201 and/or the communication unit 202. For example, the processing circuit 200 may be directly or indirectly connected (for example, possibly connected with other members therebetween) to the memory 201 for data access. As another example the processing circuit 200 may be directly or indirectly connected to the communication unit 202 to transmit a radio signal via the communication unit 202 and to receive a radio signal via the communication unit 202.

The memory 201 may store various information generated by the processing circuit 200, various information to be utilized by the processing circuit 200 (for example, the information about the cell connected mode frequency priority, the service quality measurement instruction, or the like), programs and data for operation of the electronic device 20, and data to be sent by the communication unit 202. The memory 201 is delineated with dashed lines, as it may also be located within the electronic device 20 or outside the electronic device 20. The memory 201 may be a volatile memory and/or a non-volatile memory. For example, the memory 201 may comprise, but is not limited to, random access memory (RAM), dynamic random access memory (DRAM), static random access memory (SRAM), read only memory (ROM), or flash memory.

The communication unit 202 may be configured to communicate with an user equipment under the control of the processing circuit 200. In an example, the communication unit 202 may be implemented as a transmitter or transceiver and comprise communication members such as an antenna array and/or a radio frequency link. In some embodiments, the communication unit 202 may send the service quality measurement instruction, the information about the cell connected mode frequency priority and the redirection instruction determined in the processing circuit 200 to the user equipment. In some embodiments, the communication unit 202 may also send and receive signaling required for the process described in the embodiments according to the present disclosure.

Although FIG. 6 shows that the processing circuit 200 is separated from the communication unit 202, the processing circuit 200 may also be implemented to comprise the communication unit 202. Furthermore, the processing circuit 200 may also be implemented to comprise one or more other members in the electronic device 20, or the processing circuit 200 may be implemented as the electronic device 20 itself. In actual implementations, the processing circuit 200 may be implemented as a chip (for example, an integrated circuit module comprising a single wafer), a hardware component, or a complete product.

It should be noted that, the above various units are only logical modules divided according to the specific functions realized by the same, but not intended to limit specific implementations. For example, each unit may be implemented in the form of software, hardware, or a combination of software and hardware. In actual implementations, the above various units may be each implemented as an independent physical entity or may also be implemented by a single entity (for example, a processor (CPU or DSP, etc.), an integrated circuit, or the like). In addition, the above various units are shown with dotted lines in the accompanying drawings to indicate that these units may not actually exist, and the operations/functions realized by these units may be implemented by the processing circuit itself.

Figure 7:
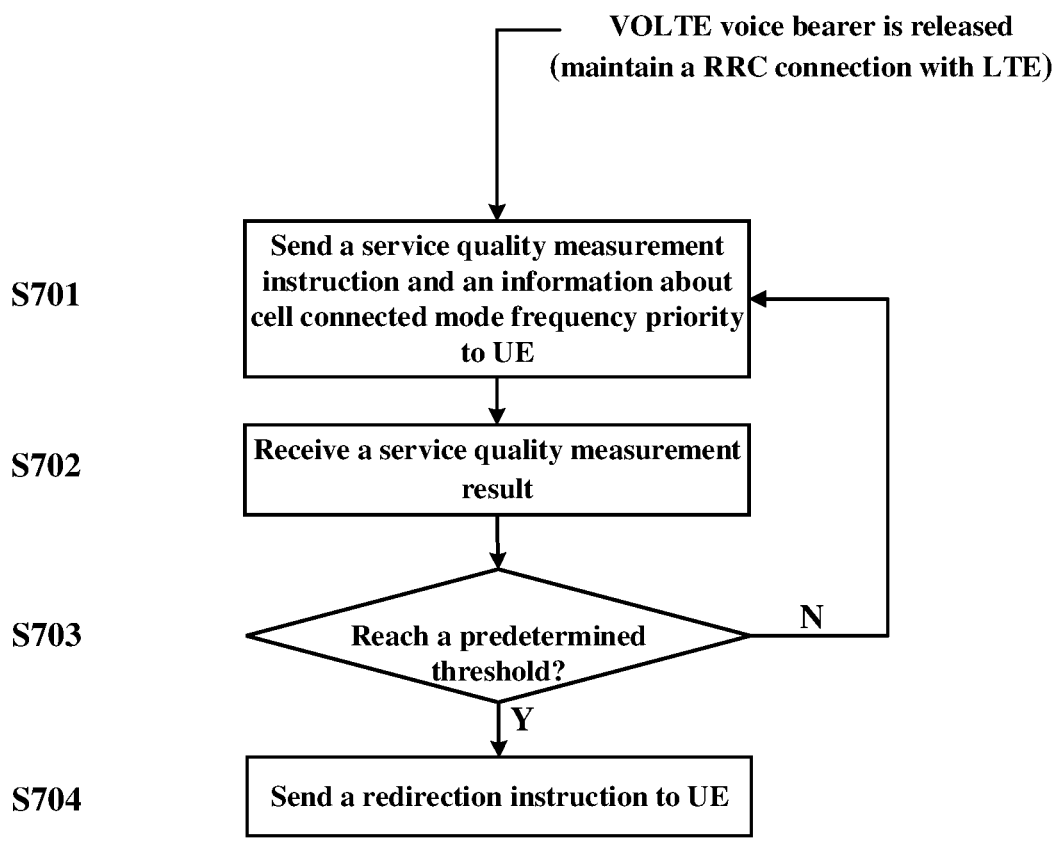
FIG. 7 is a flowchart showing operation of an electronic device for a control side of a wireless communication system according to some embodiments of the present disclosure.

FIG. 7 is a flowchart showing operation of an electronic device for a control side of a wireless communication system according to some embodiments of the present disclosure.

As shown in FIG. 7, after the voice bearer of VoLTE is released, the electronic device 20 maintains a RRC connection with a user equipment. At step S701, the electronic device 20 sends a service quality measurement instruction and an information about a cell connected mode frequency priority to the user equipment. The cell connected mode frequency priority is set with the priority of the NR cell higher than that of the LTE cell, such that the service quality of an adjacent NR cell of the user equipment can be measured in priority, and the service quality of the adjacent NR cell is measured in response to the service quality measurement instruction. Next, at step S702, the electronic device 20 receives a service quality measurement result from the user equipment. Next, at step S703, the electronic device 20 determines whether the service quality measurement result of an adjacent NR cell of the user equipment reaches a predetermined threshold. In a case where the service quality measurement result of an adjacent NR cell of the user equipment reaches a predetermined threshold ("Yes" at step S703), at step S704, the electronic device sends a redirection instruction to the user equipment, such that the user equipment is redirected to this adjacent NR cell of the user equipment. On the contrary, in a case where there is not an adjacent NR cell of the user equipment with the service quality measurement result reaching the predetermined threshold ("No" at step S703), the electronic device returns to step S702, and continues to receive a service quality measurement result from the user equipment.

In some embodiments, in a case where there are a plurality of adjacent NR cells in the vicinity of the user equipment and it is desirable that the user equipment is redirected to the NR cell with the best service quality measurement result among NR cells each with the service quality measurement result reaching the predetermined threshold, a step of determining the NR cell with the best service quality measurement result among the NR cells each with the measurement result reaching the predetermined threshold may also be added between step S703 and step S704.

In addition, according to these embodiments, the electronic device 20 presets the cell connected mode frequency priority in the LTE system before a voice service is performed, such that the cell connected mode frequency priority can be invoked in a redirection process after EPS Fallback according to these embodiments. In some embodiments, the electronic device 20 may regularly reset the cell connected mode frequency priority. Alternatively, in other embodiments, the electronic device 20 may reset the cell connected mode frequency priority when the LTE network changes.

As described above, the methods and devices according to the present disclosure can be applied to the FPS Fallback solution under SA system. By configuring the connected mode frequency priority and adding the measurement trigger function of redirection to NR in the LTE system, not only the SA system is rapidly deployed, and the construction cost is saved, but also the delay of redirecting the user equipment to the NR network is reduced, the user experience is improved, and adverse effects of cross-system operations after a voice service ends are avoided. Specifically, as an example, the delay of redirection to the NR cell according to the methods of the present disclosure is about 0.5 s, which is shortened by about 3 s compared with a traditional method, thereby significantly reducing the redirection delay.

Hereto, the methods and devices of redirection from an LTE cell to an NR cell after EPS Fallback according to the present disclosure have been described in detail. Some details well known in the art are not described in order to avoid obscuring the concept of the present disclosure. According to the above description, those skilled in the art would fully understand how to implement the technical solutions disclosed here.

The methods and systems of the present disclosure may be implemented in many manners. For example, the method and system of the present disclosure may be implemented by software, hardware, firmware, or any combination of software, hardware, and firmware. The above sequence for the steps of the method is merely for illustrative purposes, and the steps of the method of the present disclosure are not limited to the sequence specifically described above unless otherwise specified. Moreover, in some embodiments, the present disclosure may also be embodied as programs recorded in a recording medium, the programs comprise machine readable instructions for implementing the methods according to the present disclosure. Thus, the present disclosure also covers a recording medium that stores programs for performing the methods according to the present disclosure.

Although some specific embodiments of the present disclosure have been described in detail by way of examples, those skilled in the art should understand that the above examples are only for the purpose of illustration but not for limiting the scope of the present disclosure. It should be understood by those skilled in the art that modifications to the above embodiments may be made without departing from the scope and spirit of the present disclosure. The scope of the present disclosure is defined by the appended claims.

What is claimed is:

1. A method, performed by a user equipment, for redirection from an LTE cell to an NR cell after EPS Fallback, comprising:
maintaining, by the user equipment, a radio resource control (RRC) connection with the LTE cell after a voice bearer of VOLTE is released, and measuring, according to a cell connected mode frequency priority, a service quality of an adjacent cell of the user equipment, wherein the cell connected mode frequency priority is set with a priority of an adjacent NR cell higher than a priority of an adjacent LTE cell, such that priority is given to measuring the service quality of the adjacent NR cell of the user equipment;
sending, by the user equipment, a service quality measurement result to an LTE system;
receiving, by the user equipment, a redirection instruction from the LTE system, wherein the redirection instruction is sent by the LTE system when the LTE system determines the service quality measurement result of a NR cell reaches a predetermined threshold; and
redirecting, by the user equipment, to the NR cell which is an adjacent NR cell, in response to the redirection instruction,
wherein the NR cell is the adjacent NR cell with the best service quality measurement result of adjacent NR cells each with the service quality measurement result reaching the predetermined threshold, in a case where there is a plurality of adjacent NR cells of the user equipment.

2. The method according to claim 1, wherein the cell connected mode frequency priority is set by an LTE system.

3. The method according to claim 1, wherein the EPS Fallback is used for a voice service under standalone (SA).

4. The method according to claim 1, further comprising:
receiving, by the user equipment, a service quality measurement instruction and an information about the cell connected mode frequency priority from an LTE system, wherein the service quality is measured in response to the service quality measurement instruction from the LTE system.

5. The method according to claim 1, wherein the redirecting, by the user equipment, to the NR cell comprises:
disconnecting, by the user equipment, the RRC connection with the LTE cell and establishing a RRC connection with the NR cell.

6. A non-transitory computer-readable storage medium having stored thereon instructions which, when executed by a processor of a user equipment, cause the processor to implement the method according to claim 1.

7. A user equipment for a user side of a wireless communication system, comprising:
a memory storing instructions;
a processing circuit configured to execute the instructions stored in the memory to perform the following operations:
maintaining a radio resource control (RRC) connection with a LTE cell after a voice bearer of VOLTE is released, and measuring, according to a cell connected mode frequency priority, a service quality of an adjacent cell of the user equipment, wherein the cell connected mode frequency priority is set with a priority of an adjacent NR cell higher than a priority of an adjacent LTE cell, such that priority is given to measuring the service quality of the adjacent NR cell of the user equipment;
sending a service quality measurement result to an LTE system;
receiving a redirection instruction from the LTE system, wherein the redirection instruction is sent by the LTE system when the LTE system determines the service quality measurement result of a NR cell reaches a predetermined threshold; and
redirecting to an NR cell which is an adjacent NR cell, in response to the redirection instruction,
wherein the NR cell is the adjacent NR cell with the best service quality measurement result of adjacent NR cells each with the service quality measurement result reaching the predetermined threshold, in a case where there is a plurality of adjacent NR cells of the user equipment.

8. The user equipment according to claim 7, wherein the cell connected mode frequency priority is set by an LTE system.

9. The user equipment according to claim 7, wherein the processing circuit is further configured to perform the following operation:
receiving a service quality measurement instruction and an information about the cell connected mode frequency priority from an LTE system, wherein the service quality is measured in response to the service quality measurement instruction from the LTE system.

10. The user equipment according to claim 7, wherein the redirecting to the NR cell comprises:
disconnecting the RRC connection with the LTE cell and establishing a RRC connection with the NR cell.

11. An electronic device for a control side of a wireless communication system, comprising:
a memory storing instructions;
a processing circuit configured to execute the instructions stored in the memory to perform the following operations:
maintaining a RRC connection with a user equipment after a voice bearer of VOLTE is released;
sending an information about a cell connected mode frequency priority to the user equipment, wherein the cell connected mode frequency priority is set with a priority of an adjacent NR cell higher than a priority of an adjacent LTE cell, such that priority is given to measuring the service quality of the adjacent NR cell of the user equipment;
receiving, from the user equipment, a service quality measurement result; and
sending a redirection instruction to the user equipment in a case where an LTE system determines that the service quality measurement result of an NR cell which is an adjacent NR cell reaches a predetermined threshold, such that the user equipment is redirected to the NR cell,
wherein the NR cell is the adjacent NR cell with the best service quality measurement result of adjacent NR cells each with the service quality measurement result reaching the predetermined threshold, in a case where there is a plurality of adjacent NR cells of the user equipment.

12. The electronic device according to claim 11, wherein the processing circuit is further configured to perform the following operation:

sending a service quality measurement instruction to the user equipment, wherein the service quality is measured in response to the service quality measurement instruction.

* * * * *